United States Patent
Judge et al.

(10) Patent No.: US 8,209,057 B2
(45) Date of Patent: Jun. 26, 2012

(54) SYSTEM AND METHOD FOR FORMING UNIVERSAL CONTROL PANEL

(75) Inventors: John F. Judge, Galena, OH (US); James W. Holdren, Westerville, OH (US); Wanlai Lin, Dublin, OH (US)

(73) Assignee: Liebert Corporation, Columbus, OH (US)

(*) Notice: Subject to any disclaimer, the term of this patent is extended or adjusted under 35 U.S.C. 154(b) by 447 days.

(21) Appl. No.: 12/492,529

(22) Filed: Jun. 26, 2009

(65) Prior Publication Data

US 2010/0125371 A1    May 20, 2010

Related U.S. Application Data

(60) Provisional application No. 61/115,293, filed on Nov. 17, 2008.

(51) Int. Cl.
*G05D 23/00* (2006.01)
*G05D 16/00* (2006.01)

(52) U.S. Cl. ........ 700/276; 700/282; 700/300; 700/301; 62/228.4; 62/230; 318/808

(58) Field of Classification Search .................. 700/276, 700/282, 54, 55, 300, 301; 62/228.4, 228.3, 62/230, 296, 126; 318/51, 768, 808
See application file for complete search history.

(56) References Cited

U.S. PATENT DOCUMENTS

| | | | |
|---|---|---|---|
| 4,071,745 A | 1/1978 | Hall | |
| 4,257,238 A | 3/1981 | Kountz et al. | |
| 4,787,211 A | 11/1988 | Shaw | |
| 5,746,062 A * | 5/1998 | Beaverson et al. | 62/228.3 |
| 5,771,704 A | 6/1998 | Nakajima et al. | |
| 7,743,617 B2 * | 6/2010 | Crane et al. | 62/183 |
| 7,834,643 B2 * | 11/2010 | Yohanan et al. | 324/623 |
| 2004/0093893 A1 | 5/2004 | Tanimoto et al. | |
| 2008/0174257 A1 * | 7/2008 | Schnetzka et al. | 318/434 |

FOREIGN PATENT DOCUMENTS

| | | |
|---|---|---|
| EP | 0 085 454 A2 | 8/1983 |
| EP | 0 085 454 A3 | 8/1983 |
| EP | 0 599 608 A2 | 6/1994 |
| EP | 0 599 608 A3 | 5/1995 |
| WO | WO 2005/100885 A1 | 10/2005 |

OTHER PUBLICATIONS

PCT International Search Report dated Apr. 8, 2010.
PCT Written Opinion of the International Searching Authority dated Apr. 8, 2010.

* cited by examiner

*Primary Examiner* — John R. Cottingham
*Assistant Examiner* — Steven Garland
(74) *Attorney, Agent, or Firm* — Harness, Dickey & Pierce, P.L.C.

(57) ABSTRACT

A universal control panel for controlling operation of a cooling component. The universal control panel may have a variable frequency drive (VFD) that incorporates an input voltage and frequency sensing circuit; and logic, memory and communications circuits. The VFD accepts a plurality of differing input signals, analyzes the input signals and generates an output signal having a desired voltage and frequency to provide real time control over an electrical component operably associated with the cooling component. The VFD controls the cooling component in relation to changes in at least one of sensed pressure and a sensed temperature of a fluid, to dampen response of the electrical component, to thus achieve more efficient use of the cooling component being used to cool the fluid.

26 Claims, 6 Drawing Sheets

SYSTEM AND METHOD FOR FORMING UNIVERSAL CONTROL PANEL

CROSS-REFERENCE TO RELATED APPLICATIONS

This application claims the benefit of U.S. Provisional Patent Application Ser. No. 61/115,293, filed Nov. 17, 2008. The disclosure of the above application is incorporated herein by reference.

FIELD

The present disclosure relates to control systems for electric motors, and more particularly to a universal control panel having a variable frequency drive system for providing a drive signal(s) to one or more electrical devices or circuits.

BACKGROUND

The statements in this section merely provide background information related to the present disclosure and may not constitute prior art.

A variable frequency drive ("VFD") is a solid state device designed to perform motor shaft rotation speed control from zero to 100% or above the rated RPM of an alternating current (AC) motor. Output voltage and frequency to the motor are adjusted by the device to accomplish this. It is normally part of a system that includes a human machine interface ("HMI") and control that sets various operating characteristics or limits. These include but are not limited to: maximum voltage, frequency, current, temperature, acceleration rate and deceleration rate. Communication methods may be deployed between two or more VFD devices or a VFD and other control panels.

It will also be appreciated that different countries have line voltage and line frequencies that typically differ slightly. For example, the frequency of AC line power in European countries is 50 Hz, while it is 60 Hz in the United States. Thus, this gives rise to the need for the manufacturer to produce different control panels to implement different VFDs and control components that are suitable for use in different countries.

SUMMARY

In one aspect the present disclosure relates to a universal control panel that controls operation of a cooling component. The universal control panel may comprise a variable frequency drive (VFD) system which may include: an input voltage and frequency sensing circuit; and logic, memory and communications circuits. The VFD may be adapted to accept a plurality of differing input signals and to analyze the input signals. The VFD may generate an output signal having a desired voltage and frequency to provide real time control over an electrical component operably associated with the cooling component. The VFD may control the cooling component in relation to changes in at least one of sensed pressure and a sensed temperature of a fluid, to dampen response of the electrical component to thus achieve more efficient use of the cooling component being used to cool the fluid.

In another aspect the present disclosure relates to a universal control panel for controlling a temperature control component. The universal control panel may comprise a variable frequency drive (VFD) system and an intermediate control board (ICB). At least one of the ICB and the VFD may include at least one of an input voltage and frequency sensing circuit, a logic circuit and a memory circuit. At least one of the VFD and the ICB being adapted to accept at least one of a pressure signal and a temperature signal of an external component. At least one of the VFD and the ICB may further be adapted to analyze the differing input signals. The VFD may be adapted to generate an output signal having a desired voltage and frequency in relation to changes in one of a sensed pressure of a fluid or a sensed temperature of the fluid. The VFD may thus provide real time control over an electrical component operably associated with the temperature control component to thus dampen a response of the electrical component to achieve more efficient operation of the cooling component being used to cool the fluid.

In still another aspect a method for forming a universal control panel is disclosed. The method may comprise using a variable frequency drive (VFD) to receive an input voltage signal using a power conversion circuit of the VFD; to use an input voltage and frequency sensing circuit to sense a magnitude and frequency of the input voltage signal; and to use logic and memory circuits to process a plurality of inputs received by the VFD, as well as the input voltage signal. The VFD may operate to generate an output voltage signal that controls operation of a remotely located electrical component associated with a cooling component in real time, and in relation to at least one of a sensed pressure and a sensed temperature. This enables the VFD to dampen a response of the electrical component to achieve more efficient use of the cooling component.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a block diagram of a control panel in accordance with one embodiment of the present disclosure, together with a plurality of optional components which the control panel may be used with;

DETAILED DESCRIPTION

The following description is merely exemplary in nature and is not intended to limit the present disclosure, application, or uses.

Figure 1:
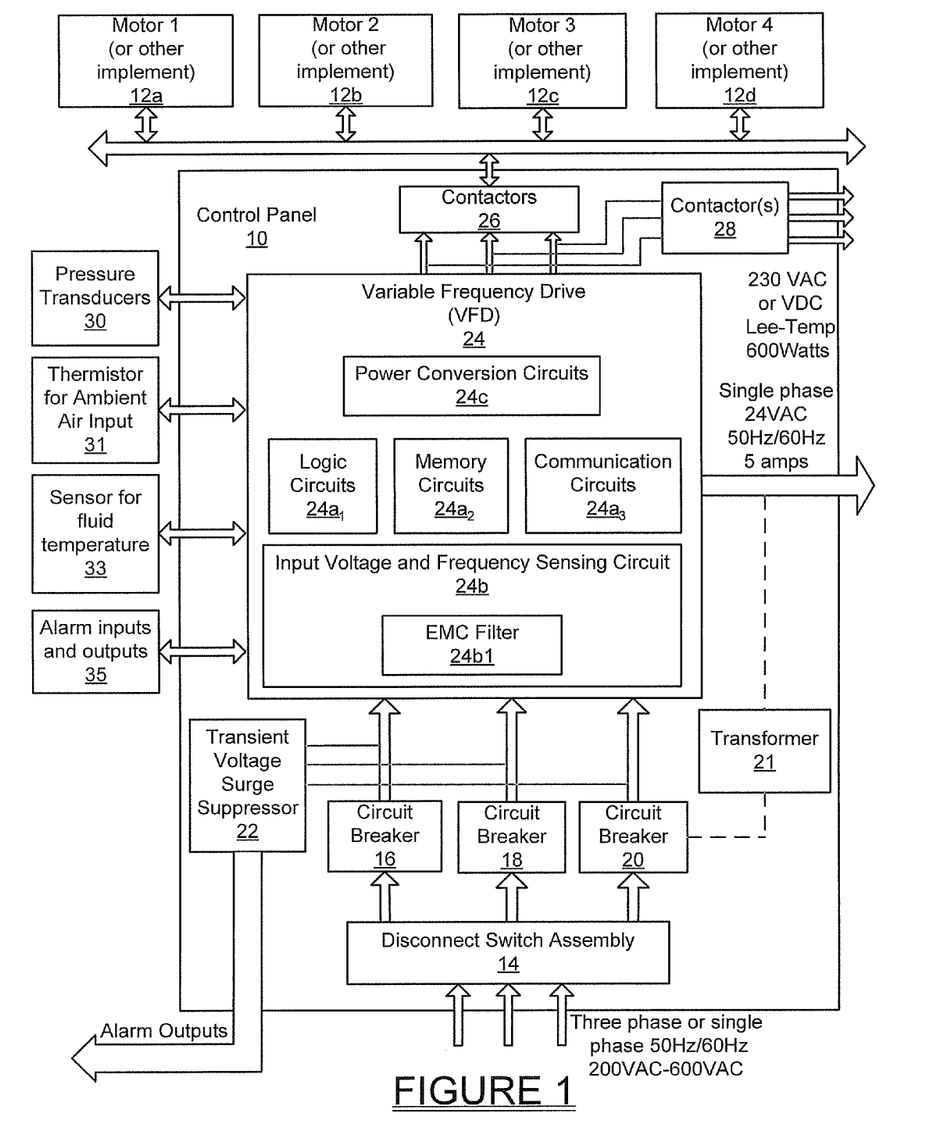

Referring to FIG. 1, there is shown a universal control panel 10 in accordance with one embodiment of the present disclosure. The control panel 10 is adapted to receive different line input signals that may vary in both voltage and frequency. For example, such input signals often will be three phase line input signals varying from 200-600 VAC, and typically may vary in frequency, sometimes between 48 Hz and 62 Hz. However, the control panel 10 is not limited to use with any specific input voltage or frequency signal. As such, input voltages of 208, 220, 380, 460, etc., and at virtually any input frequency, are all contemplated for use in providing power to the control panel 10.

The control panel 10 may be used to generate a three phase output signal having a desired magnitude and frequency, or a plurality of three phase output signals having desired magnitudes and desired frequencies to drive one or more electrical loads. In one implementation the control panel 10 is used to drive at least one electric fan motor of a condenser associated with an air conditioner.

In FIG. 1 an example of an implementation has been illustrated where four condenser fan motors 12a-12d form the loads (i.e., electrical components or devices) and are being driven by the control panel 10, with each fan motor receiving a three phase drive signal. Alternatively, the loads may form variable displacement pumps each having a motor that is driven by the control panel 10 output. The load(s) may instead comprise one or more fan motors for a fluid cooler. Still further, the loads may alternatively be an electrically controlled flow control valve, such as a motorized flow control valve. If the type of load requires a control signal rather than a drive signal, then the control signal output may be provided directly from a VFD 24, to be described momentarily, located within the control panel 10. One or more contactors 26 may be used to energize the fan motors 12a-12d as required, if one or more drive signals are being provided by the control panel 10.

The exemplary embodiment shown in FIG. 1 further may include a disconnect switch assembly 14 that may receive a three phase AC input (i.e., line) signal or a single phase AC input signal. The disconnect switch assembly 14 may be a switch, a fused switch or possibly a circuit breaker. The three phase AC input signal comprises an AC voltage signal having a frequency that may vary depending on the country where the control panel 10 is being used. Alternatively the disconnect switch assembly 14 may use single phase power from an AC source. Circuit breakers or fuses 16, 18 and 20 may be included between the disconnect switch assembly 14 and a variable frequency drive (VFD) 24. Also, transient voltage surge suppression (TVSS) circuit 22 may be coupled to the conductors feeding the AC input signal into the VFD 24 to help in suppressing transients that may be present in the AC input signal. The TVSS circuit 22 may optionally provide an alarm signal when a transient is sensed, and such alarm signal may be provided to some external component or possibly even to the VFD 24.

The VFD 24 of the control panel 10 may be programmed to provide one or more multiphase AC outputs that are tailored in magnitude and frequency to the standards of the specific country that the control panel 10 is being used in. The VFD 24 may also be used to generate a single phase output of 24VAC at a desired frequency, for example either 50 Hz or 60 Hz, with a desired output current. This signal may be used to drive or control an external device, for example a side load such as an external heater. Other possible side loads could be, without limitation, a heater, transformer, a valve or a relay. Alternatively, the 24VAC output could be provided by a transformer, such as a multi-tapped transformer 21, that receives AC input power from one of the circuit breakers 16, 18 or 20.

In FIG. 1 the VFD 24 is shown in one exemplary implementation providing a three phase output signal at a desired frequency to drive one or more of the fan motors 12a-12d. In this example all four fan motors 12a-12d are driven by a three phase AC voltage signal. The voltage of the output signal may be any voltage that the VFD 24 is programmed to provide, but in this example the output voltage from the VFD 24 may be either 460VAC or 208 VAC. One or more contactors 26 may be used to electrically couple the output of the control panel 10 to the fan motors 12a-12d. Solenoid valves or other devices (not shown) may be energized concurrently with the closures of the contactors 26. Optionally a second contactor 28 may be used to couple the single phase or three phase output to an external heater or other electrically controlled side load device (not shown) generally when contactors 26 are not energized.

A pressure transducer (or transducers) 30 may be used to monitor the compressor discharge pressure of a compressor (not shown). This feature will be described more fully in the following paragraphs. Additional optional components such as a thermistor 31 for providing an ambient air temperature signal, a sensor, for example a thermistor 33, for providing a fluid (e.g., refrigerant) temperature signal, and one or more alarm inputs and outputs 35 may be incorporated to provide input signals to, or to communicate information from, the VFD 24. The sensor 33 for providing a refrigerant temperature signal could be used if the control panel 10 is being used to control a motor associated with a cooling system. Suitable software running in the VFD 24 may be used to analyze all of the inputs provided to the VFD 24 and to help control the generation of one or more output signals from the VFD 24.

The VFD 24 may include logic circuits $24a_1$, memory circuits $24a_2$ and communication circuits $24a_3$, that may be referred to throughout the following discussion simply as "logic, memory and communication circuits $24a$". The VFD 24 may also include input voltage and frequency sensing circuits 24b and power conversion circuits 24c. The input voltage and frequency sensing circuit 24b may optionally include an EMC filter 24b1 that reduces any electromagnetic high frequency noise that may be emitted by the VFD 24, and also provides the VFD 24 with a level of immunity from outside electrical disturbances.

The VFD 24 is preferably programmed with one or more suitable algorithms to provide the desired output signal or signals. Analog inputs of temperature, pressure, voltage, and frequency may be digitized and compared to known characteristics, relationships or limits stored in the memory circuits $24a_2$ of the logic, memory and communication circuits $24a$. These can be a thermistor resistance-to-temperature relationship, refrigerant pressure-to-temperature relationship, voltage magnitude with respect to a table of typical utility power supplies, and frequency magnitude with respect to a table of typical utility power supplies. Certain algorithms may work together to determine outputs. As an example, consider that ambient temperature is measured, refrigerant pressure is measured, and the refrigerant has a known pressure-to-temperature relationship. The measured ambient temperature can be compared to the corresponding temperature of the measured pressure. Based on a positive or negative difference, various outputs can be energized or de-energized as required.

Figure 1A:
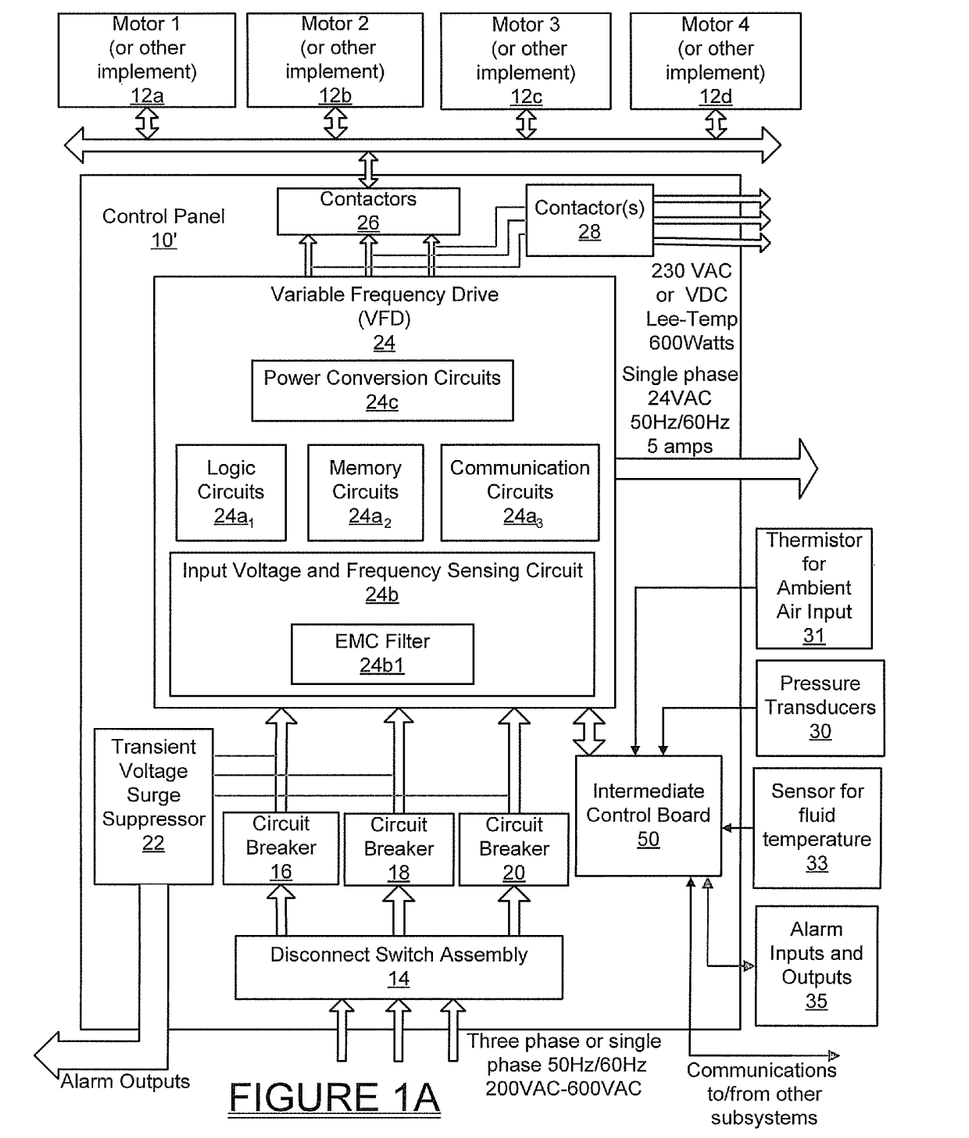
FIG. 1A is a block diagram of a control panel in accordance with another embodiment of the present disclosure that makes use of an intermediate control board that communicates with the VFD.

Referring to FIG. 1A, another embodiment of the present disclosure is presented that shows a control panel 10' being used to communicate with an intermediate control board (ICB) 50. In this implementation the ICB 50, while included within the control panel 10', forms an independent subsystem that may be used to perform part or all of the analysis and computation operations that would otherwise be performed by the components of the VFD 24, and may optionally include one or more of its own circuits, such as logic and processing circuits and/or memory circuits. The ICB 50 may be used to communicate with the loads 12a-12d through the VFD 24 or may communicate directly with the loads, in effect bypassing the VFD 24. For example, the ICB 50 may include one or more of circuits $24a_1$, $24a_2$, $24a_3$ that are illustrated in FIG. 1. The ICB 50 may also be used to receive and monitor the outputs from the ambient air temperature thermistor 31, the pressure transducers 30, the sensor 33, and/or communications from other external subsystems or circuit boards. The ICB 50 may also be used to provide an alarm to an external component or subsystem. While only one ICB 50 is shown, it will be appreciated that two or more ICBs 50 could just as readily be included within the control panel 10' to meet the needs of a specific application.

Figure 1B:
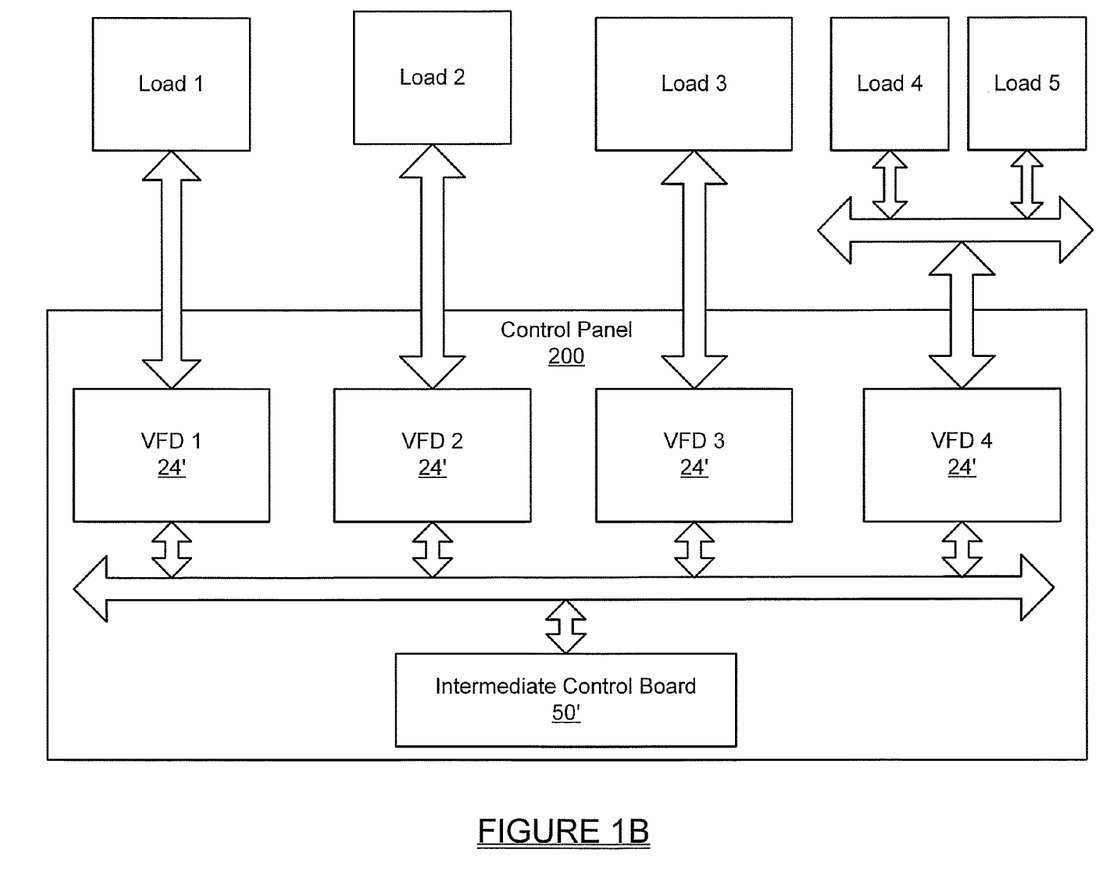
FIG. 1B is a block diagram of another embodiment of the present disclosure where the control panel includes a plurality of VFDs that are used to control a plurality of loads.

Referring briefly to FIG. 1B, a control panel 200 in accordance with another embodiment of the present disclosure is shown. In this embodiment the control panel 200 includes a plurality of VFDs 24' that are configured to communicate bidirectionally with an ICB 50'. While not specifically shown, it will be appreciated that each VFD 24' may include any one or more of the components $24a_1$, $24a_2$, $24a_3$, 24b, $24b_1$ and 24c shown in the control panel 10 of FIG. 1, and the control panel 200 may receive any one or more of the inputs that the control panel 10 receives. VFD1, VFD2 and VFD3 are shown each controlling a single load (Loads 1, 2 and 3 respectively). VFD4 is shown controlling loads 4 and 5. Thus, each VFD 24' may be used to control one or more loads.

Figure 2:
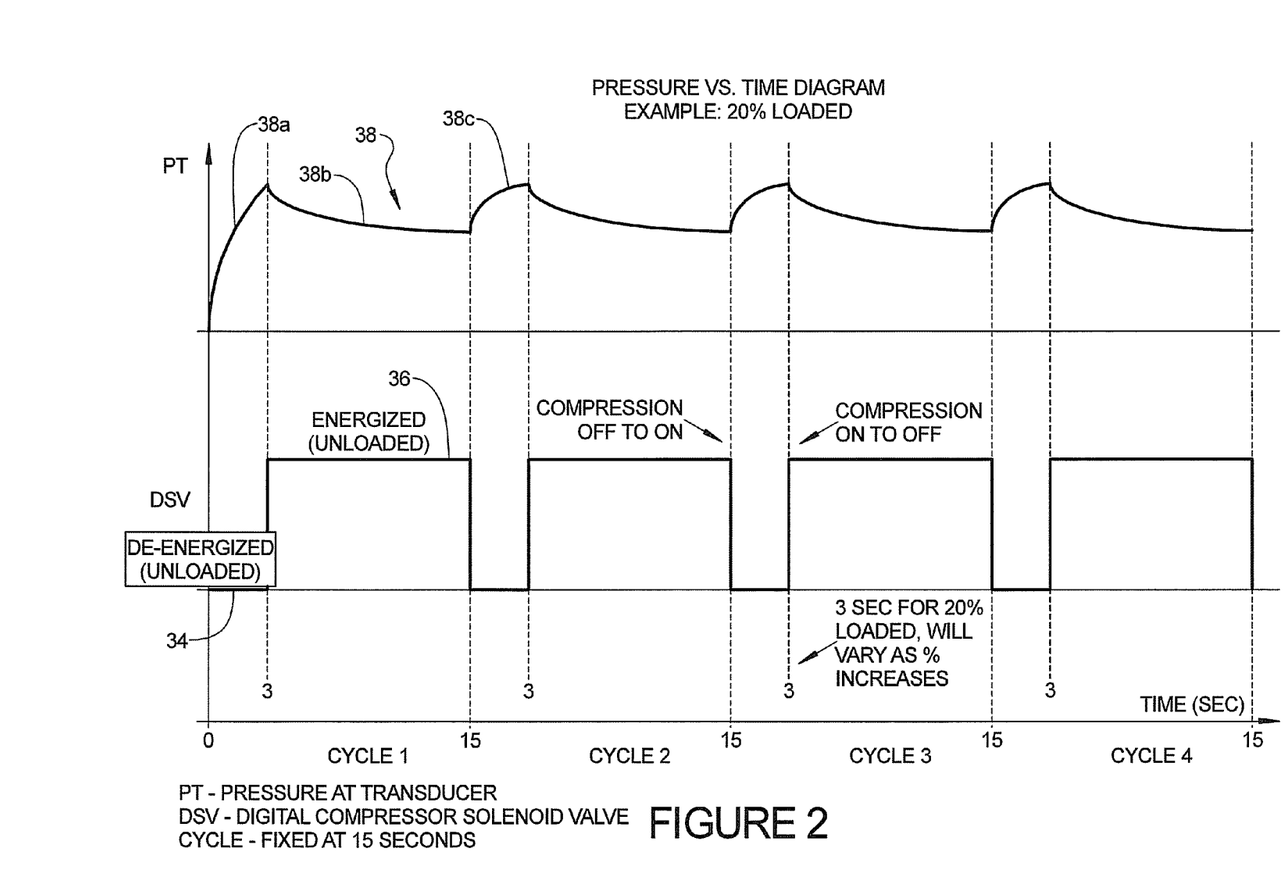
FIG. 2 is a series of exemplary waveforms illustrating the pressure sensed by a pressure transducer that is monitoring the discharge pressure of a compressor.
Figure 3:
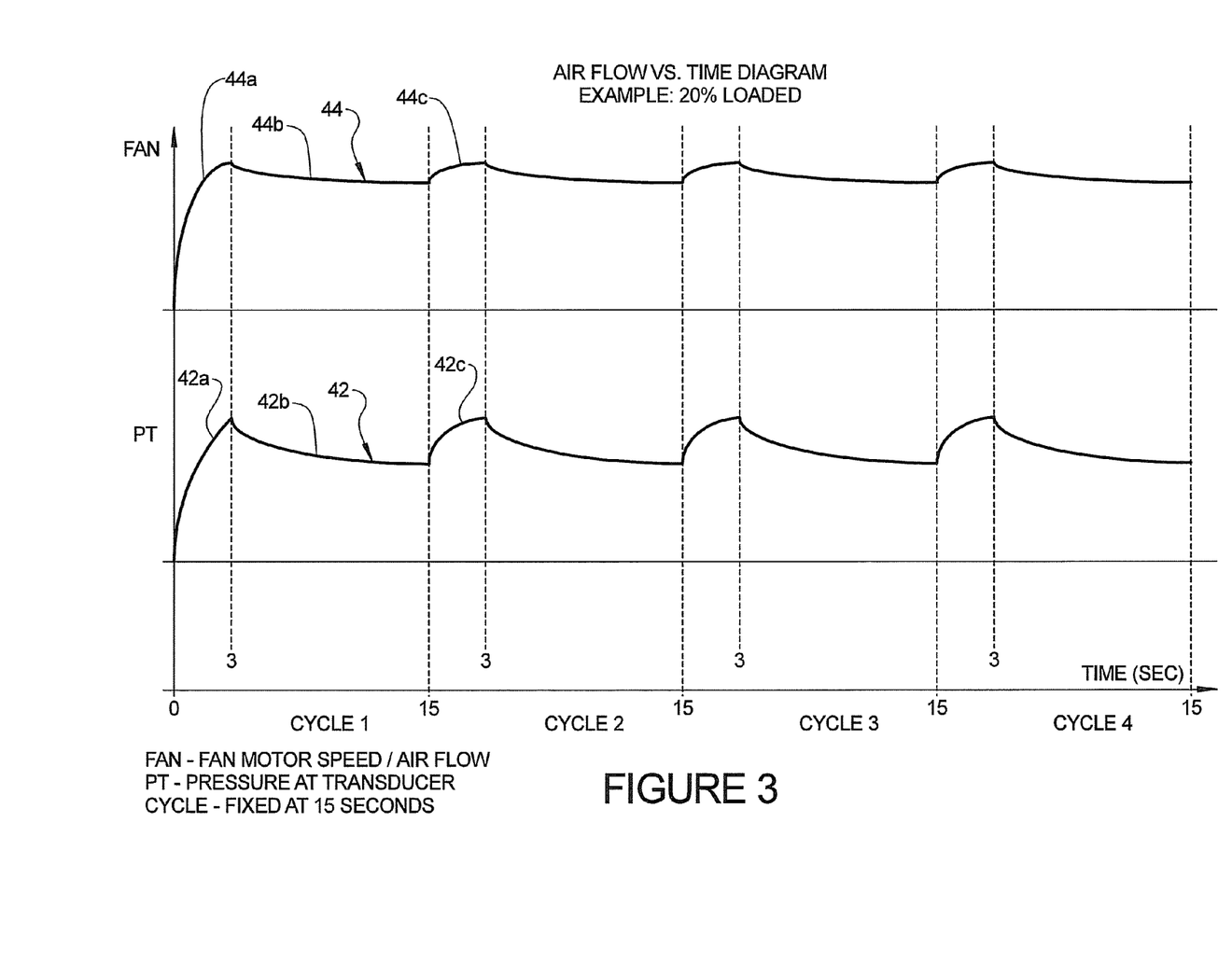
FIG. 3 is a pair of exemplary waveforms illustrating the relationship between fan motor speed and airflow relative to the pressure sensed by a pressure transducer, and illustrating how the VFD of the present disclosure is able to smooth out operation of the fan during periods of changing compressor discharge pressure.

With further reference to the control panel 10 of FIG. 1 and the compressor application mentioned above, the VFD 24 may also be programmed to integrate fluctuating compressor discharge pressure signals created by compressor unloading (including digital scroll compressors) and varying condenser capacity created by lower ambient temperatures. The VFD 24 may be used to adjust the speed of one or more of the fan motors 12a-12d to provide a stable condensing temperature. With reference to FIGS. 2 and 3, this feature can be understood more fully. In FIG. 2, a waveform 32 is associated with a digital compressor solenoid valve. The "De-energized (loaded)" portion of the waveform labeled with numeral 34 indicates the solenoid valve in a closed condition. The "Energized (Unloaded)" portion of the waveform 32, labeled 36, indicates the solenoid valve in an open condition. Waveform 38 is a graph of the pressure that the pressure transducer 30 sees in monitoring the discharge pressure of a digital compressor. When the solenoid valve is closed, compressor discharge pressure builds rapidly as indicated by portion 38a of waveform 38. When the solenoid valve is opened, the pressure seen by the pressure transducer 30 begins to drop, but at a gradual rate, as indicated by waveform portion 38b. When the solenoid valve is again closed the compressor discharge pressure builds up rapidly, as indicated by portion 38c of the waveform 38. In the example shown in FIG. 2, the solenoid valve cycles between open and closed conditions every 15 seconds, although it will be appreciated that this period may be varied as needed (i.e., made greater or less than 15 seconds) to suit specific applications. The loaded and unloaded times will vary within the 15 second period in accordance with the cooling system requirements. FIG. 2 shows a system with 20% loading as determined from the ratio of 3:15 (3 second loaded to the 15 second period).

FIG. 3 illustrates how the VFD 24 of the control panel 10 can be used to smooth out operation of a fan motor used with a condenser of a compressor system. Waveform 42 represents the pressure seen by the pressure transducer 30. Waveform 44 represents the speed of operation of a fan motor, which may be for example motor 12a in FIG. 1. Initially, when the pressure transducer 30 senses a build up in compressor discharge pressure, as indicated by portion 42a of waveform 42, the speed of the fan motor increases rapidly, as indicated by portion 44a of waveform 44. When the pressure transducer 30 senses a drop in compressor discharge pressure, as indicated by waveform portion 42b, however, the VFD 24 operates to maintain the fan motor speed almost constant (i.e., just slightly declining), as indicated by portion 44b of waveform 44. When the sensed compressor discharge pressure begins to rise again, as indicated by waveform portion 42c, the speed of the fan motor increases as well, but only slightly, as indicated by waveform portion 44c. Thus, the VFD 24 operates to significantly smooth out the operation of the fan motor, which enables more efficient operation of the fan motor. While the foregoing discussion has described the control of only one fan motor, it will be appreciated that the same operation may be taking place for each of fan motors 12a-12d.

It will also be appreciated that the compressor refrigerant discharge pressure that is indicated in FIG. 3 by waveform 42 could just as readily be a fluid temperature that is being sensed by sensor 33. In that instance, the various embodiments of the control panel 10 will operate to dampen the response of the electrical component that is being used to help control the fluid temperature so that more efficient operation of the electrical component is achieved. As mentioned herein, the electrical component could be a motorized fluid flow control valve, a pump motor or virtually any form of electrical device that is able to help control either a pressure or a temperature of a fluid.

An ancillary benefit of the control panel 10 is that the damped response of the fan motors 12a-12d (or any other form of cooling component having a variable speed) can make for a more audibly pleasing environment. Without the control panel 10, operation of the fan motors 12a-12d would be such that the motor speeds could be ramping up and down more dramatically over a given period of time, and thus generating more noticeable fan noise. By damping operation of the fan motors 12a-12d, the noise generated by the motors is effectively made less conspicuous to individuals that may need to work in proximity to the condenser(s) with which the fan motors 12a-12d are associated with.

Figure 4:
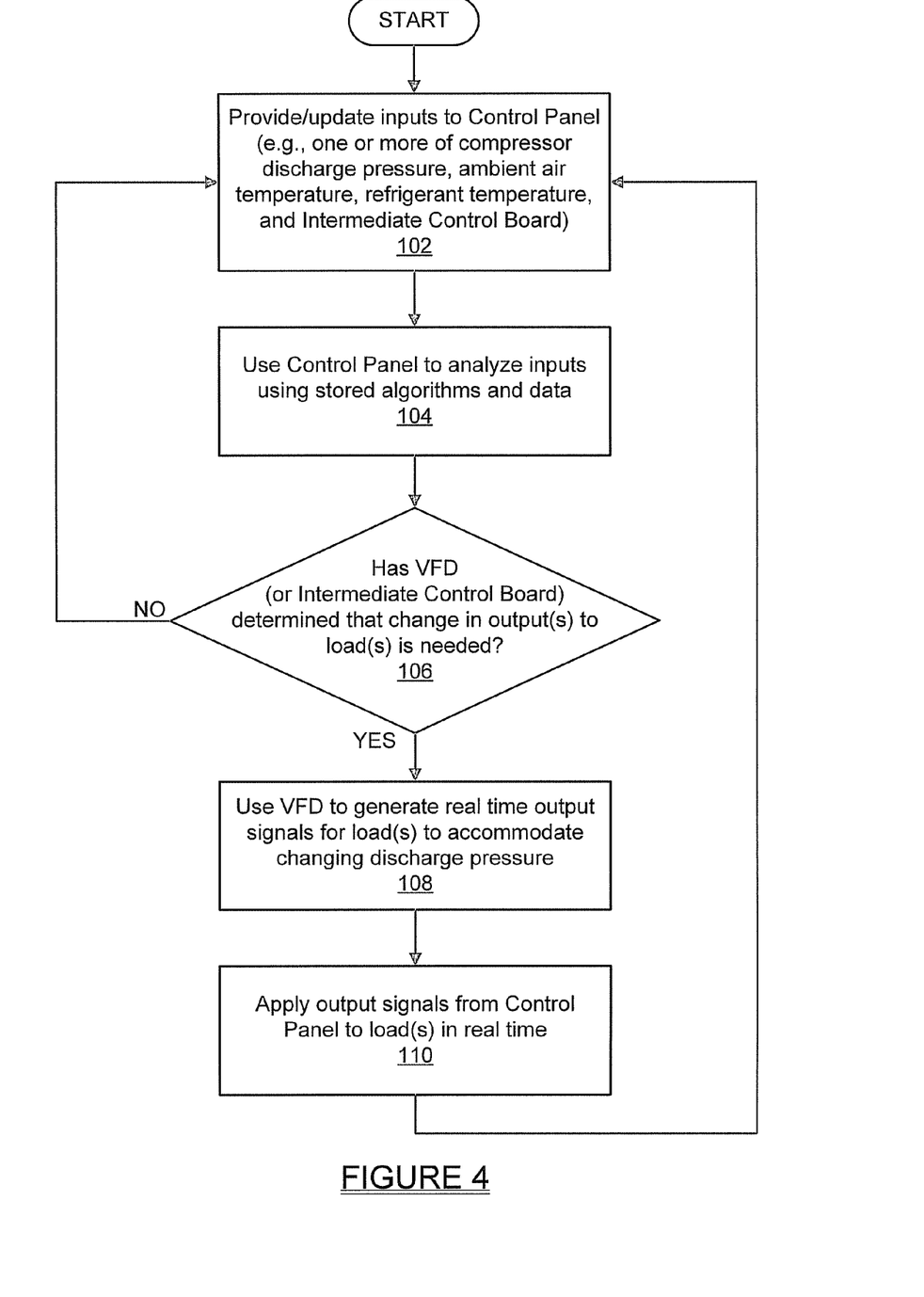
FIG. 4 is a flowchart illustrating operations that may be performed by the control panel.

Referring to FIG. 4 a flowchart 100 is shown illustrating one example of operations that may be performed by the control panel 10. At operation 102 one or more of various inputs such as compressor discharge pressure, ambient air temperature, refrigerant temperature and any alarm inputs may be sensed and provided to the control panel 10. If an intermediate control board is being used, then it may also provide an output to the VFD 24 of the control panel 10. At operation 104 the control panel 10 may analyze the signals represented by the inputs using its stored algorithms and data. This may involve using the VFD 24 to perform the analysis, or if the ICB 50 is being employed within the control panel 10, then the ICB 50 may be used to perform a portion, or potentially all, of the analysis operation that would otherwise be performed by the VFD 24. At operation 106 the VFD 24 (or the ICB 50) may determine if a change is needed in the output signal(s) being generated for the fan(s) of motor(s) 12. At operation 108 the VFD 24 (and/or the ICB 50) may be used to generate real time output signals for the fan(s) of the motor(s) 12 to accommodate changing compressor discharge pressure or to accommodate any other circumstance that makes modification of the output signal(s) necessary. If the VFD 24 determines that no modifications are needed to the output signal(s) at operation 106, then operations 102-106 are repeated.

If the determination at operation 106 indicates that a modification to the output signal(s) is needed, then at operation 108 the VFD 24 (and possibly the ICB 50) generates real time output signal(s) for the fan motor(s) 12 to accommodate the changing compressor discharge pressure, or for any other reason. At operation 110 the newly generated output signals are applied to the fan motor(s) 12. Operations 102-106 are then repeated. It will be appreciated that while the control panel 10 has been described in the example flowchart 100 as controlling one or more condenser fan motors 12, that the control panel 10 could use the control scheme shown in FIG. 4 to control any other type of electrical component that allows control over its operation. As such, the foregoing discussion is not limited to only controlling the speed of condenser fan motors, but encompasses controlling other loads such as, without limitation, variable displacement pumps and electrically controlled valves.

As additional examples of the versatility of the various embodiments of the control panel 10 described herein, the control panel may be adapted, with little or no modification, to regulate the temperatures of other fluids such as water or a water/glycol mixture. This may be accomplished by varying the speed of one or more of the fans being driven by the motors 12a-12d. The temperatures of fluids may also be controlled by the various embodiments of the control panel 10 by using the control panel 10 to vary the fluid flow rate through control of a variable displacement pump or electrically motorized valve, acting as the load. The control panel 10 may be used to provide drive or control signals to tailor it for use with specific types of loads. Additionally, it is possible that the various embodiments of the control panel 10 described herein may be used to simultaneously control different types of loads using both drive signals and control signals, depending on the needs of the specific load being controlled. The control panel 10 is also equally applicable for use with a dry cooler.

From the foregoing it will be appreciated that the VFD 24 of the control panel 10 integrates fluctuating compressor discharge pressure signals created by compressor unloading, and accommodates varying condenser capacity created by lower ambient temperatures. The VFD 24 adjusts a motor fan speed to provide a stable condensing temperature. This can serve to dampen the response to inputs that the VFD 24 is receiving and help to minimize fluctuations in air flow of the fan motor(s) 12. The VFD 24 also provides protection for motor overload and incoming power supply phase loss, under-voltage and over-voltage conditions.

The VFD 24 thus is able to accept one or more inputs and to generate a single output signal of a desired voltage and frequency, or a plurality of output signals having differing voltages and frequency. The VFD 24 can be used to drive (or control) one or a plurality of loads including motors, pumps, control circuits, heaters or other widely varying types of loads. It may also include multiple power or control output modules and may accommodate thermistor inputs for ambient air, refrigerant or alarm indications. The VFD 24 may be used with or without other intermediate control boards, and the control panel 10 may use a plurality of VFDs 24 to meet the needs of specific applications.

Example embodiments have been provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A universal control panel for controlling operation of a fluid-to-air heat exchanger, the universal control panel comprising:
    a variable frequency drive (VFD) system including:
        an input voltage and frequency sensing circuit; and
        logic, memory and communications circuits;
    the VFD being adapted to accept a plurality of differing input signals and to analyze the differing input signals and to generate an output signal having a desired voltage and frequency to provide real time control over an electrical component operably associated with the fluid-to-air heat exchanger;
    the VFD controlling the fluid-to-air heat exchanger responsive to changes in at least one of sensed pressure and a sensed temperature of a fluid associated with the fluid-to-air heat exchanger, to dampen response of the electrical component to thus achieve more efficient use of the fluid-to-air heat exchanger being used to cool the fluid.

2. The universal control panel of claim 1, wherein the VFD is adapted to provide real time control over the electrical component associated with the fluid-to-air heat exchanger, and wherein the electrical component includes at least one of:
    a motor of a fan of a condenser associated with the fluid-to-air heat exchanger;
    a motorized fluid flow control valve associated with the fluid-to-air heat exchanger; and
    a motor driven fluid pump associated with the fluid-to-air heat exchanger.

3. The universal control panel of claim 1, wherein the VFD further comprises a power conversion circuit for converting power received from at least one of a single phase power source or a three phase power source, to a fixed voltage and frequency independent of incoming power.

4. The universal control panel of claim 3, wherein said fixed voltage comprises one of a single phase output voltage or a three phase output voltage.

5. The universal control panel of claim 1, wherein the VFD is adapted to accept a range of input voltages having a range of input frequencies.

6. The universal control panel of claim 1, further comprising at least one contactor for coupling the output signal to the electrical component.

7. The universal control panel of claim 1, further comprising a transient voltage surge suppressor circuit for suppressing transients on one or more input voltage signals being input to the control panel.

8. The universal control panel of claim 1, wherein the VFD is adapted to receive at least one signal from the group comprising:
  a pressure transducer that monitors a refrigerant discharge pressure of a compressor;
  a thermistor that senses ambient air temperature; and
  a sensor that senses a temperature of at least one of a refrigerant or a liquid; and
  an alarm.

9. The universal control panel of claim 1, further comprising:
  a first plurality of contactors for coupling an output generated by the VFD to a first collection of external components, and
  a second plurality of contactors for coupling an output generated by the VFD to a second collection of external components.

10. The universal control panel of claim 9, wherein at least one of the first and second collections of external components comprises at least one side load, and wherein the at least one side load comprises one of a heater, a transformer, a valve and a relay.

11. The universal control panel of claim 1, further comprising an intermediate control board (ICB) in communication with the VFD.

12. The universal control panel of claim 1, further comprising an intermediate control board (ICB) in communication directly with the electrical component associated with the fluid-to-air heat exchanger.

13. The universal control panel of claim 1, wherein the control panel includes a plurality of VFDs controlling a plurality of different electrical components forming different loads.

14. A universal control panel for controlling an electrical component associated with a fluid-to-air heat exchanger, the universal control panel comprising:
  a variable frequency drive (VFD) system;
  an intermediate control board (ICB);
  at least one of the ICB and the VFD including at least one of:
    an input voltage and frequency sensing circuit; and
    a logic circuit; and
    a memory circuit;
  at least one of the VFD and the ICB being adapted to accept an ambient temperature thermistor signal input from an ambient temperature thermistor that senses an ambient air temperature, and at least one of a pressure signal and a temperature signal of an external component, and at least one of the VFD and the ICB further being adapted to analyze at least one of the pressure and temperature signals, and
  the VFD being adapted to generate an output signal having a desired voltage and frequency in relation to changes in the ambient air temperature and at least one of a sensed pressure of a fluid or a sensed temperature of the fluid, to thus provide real time control over the electrical component associated with the fluid-to-air heat exchanger to thus dampen a response of the electrical component to achieve more efficient operation of the fluid-to-air heat exchanger being used to cool the fluid.

15. The universal control panel of claim 14, wherein the pressure signal relates to a refrigerant discharge pressure of a compressor, and wherein the fluid comprises a refrigerant being compressed by the compressor.

16. The universal control panel of claim 14, wherein at least one of the VFD and the ICB further comprises a communication circuit for facilitating communications with at least one component remote from the universal control panel.

17. The universal control panel of claim 14, wherein the VFD further comprises a power conversion circuit for converting an AC input signal received by the control panel in a fixed voltage and frequency independent of incoming power.

18. The universal control panel of claim 14, further comprising a transient voltage surge suppressor circuit for suppressing transients in input voltage signals received by the universal control panel.

19. The universal control panel of claim 14, wherein the output signal generated by the VFD is adapted to control operation of the electrical component, and wherein the electrical component includes one of:
  a fan motor of a condenser;
  a motorized fluid flow control valve; and
  a motor of a fluid pump.

20. The universal control panel of claim 14, wherein at least one of the VFD and the ICB is adapted to receive at least one signal from the group comprising:
  a pressure transducer that monitors a discharge pressure of a compressor;
  a sensor that senses a temperature of a fluid; and
  an alarm.

21. The universal control panel of claim 14, wherein the ICB communicates directly with the electrical component.

22. The universal control panel of claim 14, wherein the universal control panel controls the electrical component to minimize audible variations caused by speed changes in an operation of the electrical component.

23. A method for forming a universal control panel, comprising:
  using a variable frequency drive (VFD) to:
    receive an input voltage signal using a power conversion circuit of the VFD;
    receive an ambient temperature thermistor signal input from an ambient temperature thermistor associated with an ambient environment that senses ambient air temperature in a vicinity of a remotely controlled electrical component;
    use an input voltage and frequency sensing circuit to sense a magnitude and frequency of the input voltage signal;
    to use logic and memory circuits to process a plurality of inputs, including the ambient temperature thermistor signal input, received by the VFD, as well as the input voltage signal, and to generate an output voltage signal that controls operation of the remotely located electrical component associated with a fluid-to-air heat exchanger in real time, and in relation to the ambient environment and at least one of a sensed pressure and a sensed temperature, to thus dampen a response of the electrical component to achieve more efficient use of the heat exchanger; and wherein the remotely located electrical component includes one of a motor of a fan, a motor of a fluid control valve, and a motor of a pump.

24. The method of claim 23, wherein said receiving an input voltage signal comprises receiving one of a three phase input voltage signal and a single phase input signal.

25. The method of claim 23, wherein using the logic and memory circuits to process a plurality of inputs received by the VFD comprises using the logic and memory circuits to process at least a plurality of:

a signal supplied from a pressure transducer as to a discharge pressure of a compressor;

a signal supplied from a sensor indicating a temperature of a refrigerant of a compressor in communication with the control panel; and an alarm input.

26. The method of claim 23, further comprising using an intermediate control board to handle at least a portion of inputs received by the control panel.

* * * * *